Dec. 26, 1933. B. BOUDA 1,941,244
FEED MIXER
Filed Dec. 4, 1931
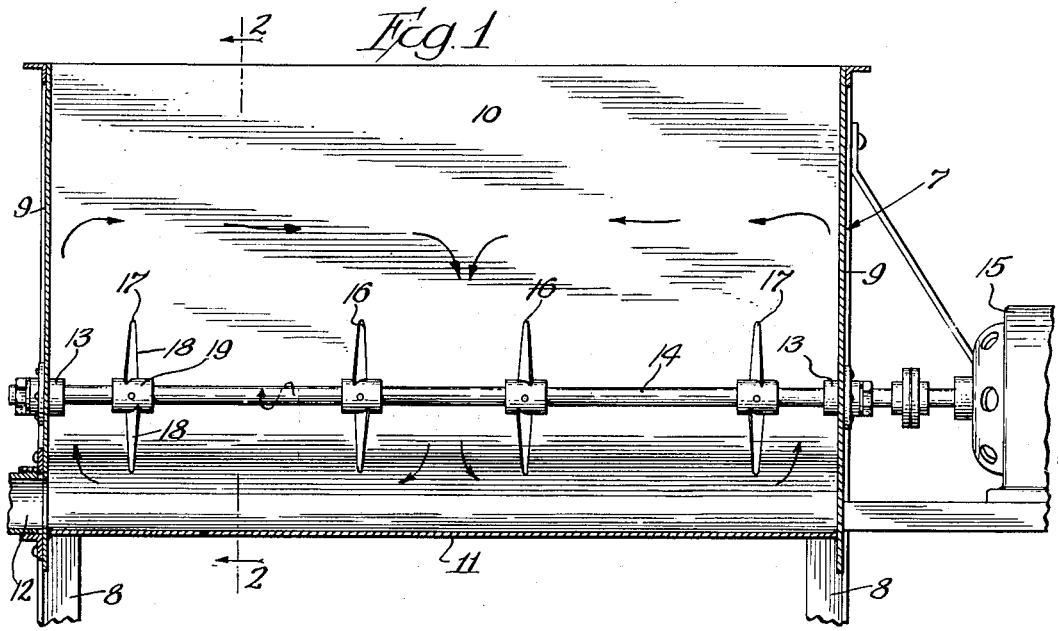
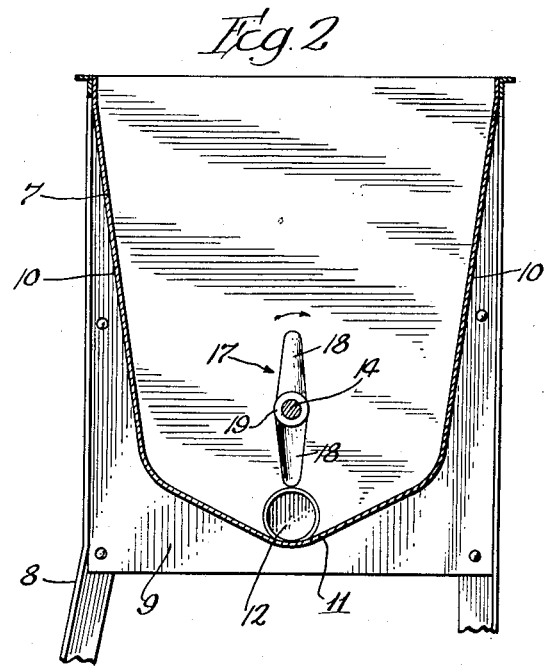
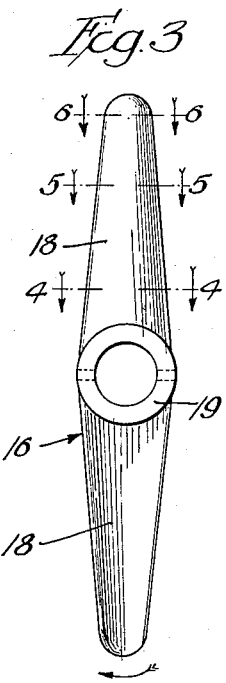
Inventor:-
Bohumil Bouda Patented Dec. 26, 1933

1,941,244

UNITED STATES PATENT OFFICE 1,941,244

FEED MIXER

Bohumil Bouda, Clinton, Iowa, assignor to The Collis Company, Clinton, Iowa, a corporation of Iowa Application December 4, 1931. Serial No. 578,892

4 Claims. (Cl. 259—109)

This invention relates to feed mixers, and its principal object is the provision of simple and efficient means for thoroughly and rapidly mixing feed. The mixer has been designed to handle ground or cracked grain, such as corn meal, wheat flour middlings, wheat red dog, fine ground cut groats, ground oil cake meal, linseed oil meal, rolled oats, and the like, and various combinations of these ingredients, together with sifted meat scraps and salt.

In accordance with the present invention, the feed is mixed in water and the mixing is accomplished practically during the time that the feed is being introduced into the mixer. Feed of this general character is likely to float upon the surface of the water until it becomes at least partially saturated, and with the ordinary mixer considerable time is lost because of this tendency of the feed to float.

One of the objects of this invention is to provide specially designed propellers disposed in such relation to each other that the feed is instantaneously drawn down with the water upon being deposited thereon and thereafter distributed through the water by currents which are set up by the propellers.

Another object is the provision of high speed propellers having relatively narrow and thin tapering blades, the area and pitch of which are greatest adjacent the hub of the propeller and gradually becoming less towards the tip thereof, whereby the velocity of the currents set in motion adjacent the hubs of the propellers is greater near the axis of rotation than at the tips of the propellers. This construction and arrangement permits of the use of a low powered motor for driving the propellers at a relatively high speed.

Other objects and advantages will appear in the course of this specification, and with said objects and advantages in view, this invention consists in the several novel features of construction, arrangement and combination of parts hereinafter fully set forth and claimed.

An exemplification of the invention is illustrated in the drawing accompanying this specification in which—

Figure 1 is a central vertical longitudinal section through a feed mixer with certain portions partly broken away;

Fig. 2 is a vertical cross section taken on the line 2—2 of Fig. 1;

Fig. 3 is a side elevation of one of the propellers;

Fig. 4 is a detail horizontal section through one of the blades of the propeller taken on the line 4—4 of Fig. 3;

Fig. 5 is a similar section taken on the line 5—5 of Fig. 3; and

Fig. 6 is a similar section taken on the line 6—6 of Fig. 3.

Referring to the drawing, the reference character 7 designates a tank or other open-top receptacle mounted upon a suitable frame 8 and comprises end walls connected by side walls 10 and a U-shaped or trough-like bottom 11. At one end of the tank is a discharge pipe 12 controlled by a suitable valve (not shown) through which the mix is drained from the tank.

Journaled in bearings 13 mounted on the end walls of the tank is a propeller shaft 14 which projects beyond one end wall and is connected to and driven by an electric motor 15 or other power source. A relatively low powered motor is desirably employed and drives the propeller shaft at high speed, 1200 R. P. M. being suggestive to obtain the best results.

Pinned or otherwise secured upon the propeller shaft are propellers 16 and 17, certain of which are located adjacent the middle of the tank and others adjacent the end walls thereof. While the proportions of the tank and propellers shown and the exact spacing of the latter is not essential to this invention broadly considered, in actual practice they have been found to give excellent results. For instance, in a tank four feet long, nine inch propellers have been found desirable, the middle propellers being spaced approximately ten inches apart, whereas the end propellers are each spaced approximately five inches from the end walls of the tank. This particular spacing may, however, be varied within given limits, but desirably with the middle propellers spaced approximately twice the distance apart that the end propellers are spaced from the end walls.

The blades of the several propellers are directed to propel the contents of the tank from the middle or center thereof towards the end walls, and the middle propellers should be placed sufficiently close to force the liquid from between them in volume sufficient to create a down current which draws down the mix that is being poured into the mixer. The end propellers should be placed close enough to the end walls of the tank to propel the current thereagainst with a force sufficient to cause the current to back away again and proceed towards the center and yet sufficiently remote from the end walls to permit the current to pass around and over the propellers in following this path.

The propellers are of novel design. As shown, each propeller comprises two blades 18 which project in opposite directions from a hub 19. The blades are relatively narrow and thin and taper from the hub towards their tips. The pitch of the blades is such that the greatest thrust is developed adjacent the hubs and diminishes towards the tips. An example of a desirable shape of blade is illustrated in Figs. 4, 5 and 6 which are suggestive of the cross section of the blade taken at several places thereon. With the use of a propeller of the form illustrated, it may be rotated at high speed through the water with a low powered motor and varying currents are produced in the water, thus distributing the mix therein very thoroughly.

In the operation of the mixer, water is poured into the tank to a level slightly above the tops of the propellers. With the shaft rotating at high speed, the mix is poured into the tank as fast as it submerges, and, as a preference, is poured in at the middle of the tank. When the required quantity has been poured in the mixing operation is practically complete, the motor may be stopped directly thereafter, and the mixed feed is drained out through the discharge pipe ready for use.

During the operation of the mixer, the mix as it falls upon the water is instantly drawn down between the middle propellers and is thrust or propelled in opposite directions towards the end propellers which propel the mass towards and against the end walls with sufficient force to cause the mass to back away again and proceed toward the middle of the tank where it is again drawn inwardly by the middle propellers and again forced back towards the end walls, this action being continued throughout the mixing operation. The arrows in Fig. 1 indicate roughly the directions taken by the currents set in motion by the propellers. Because of the particular design of the propellers, currents of varying velocity are set up thereby and thus a greater intermingling of the mixture is obtained during the short space of time required to thoroughly mix the feed.

In accordance with the present invention, the mixing is not only obtained by the action of the propellers upon the mix itself, but the high efficiency of the mixer is attributed to the fact that the varying currents are set up in the water by high speed propellers, which currents carry the mix from the middle of the tank to the ends thereof and back again, thus frequently circulating the mix through the tank during the mixing operation.

I claim:

1. A feed mixer in which is comprised a level-bottom tank adapted to receive water and a mix, a high speed shaft extending longitudinally therein adjacent the bottom wall of the tank and spaced a material distance below the top thereof, and two groups of propellers alone mounted on said shaft arranged to propel the contents of the tank from the middle lower portion thereof towards its opposite end walls, the latter serving to deflect the propelled mass upwardly and outwardly from the axis of the shaft to travel in the reverse direction above the propellers to the middle of the tank.

2. A feed mixer in which is comprised a level-bottom tank adapted to receive water and a mix, a high speed shaft extending longitudinally therein adjacent the bottom of the tank, and two groups of propellers alone mounted on said shaft and arranged to propel the contents of the tank from the middle lower portion thereof to the opposite ends, the middle propellers being spaced sufficiently close to instantly draw down any mix deposited upon the water between said propellers, and the end propellers being spaced sufficiently close to the end walls to propel the mass against said end walls with a force sufficient to carry the mass outwardly and upwardly from the axis of the shaft and to the central upper portion of the tank, the space between the two groups of propellers being unobstructed.

3. A feed mixer in which is comprised a level-bottom tank adapted to receive water and a mix, a high speed shaft extending longitudinally therein adjacent the bottom wall thereof, two oppositely acting propellers mounted on the shaft adjacent the middle of the tank and two oppositely acting propellers mounted on the shaft adjacent the end walls of the tank, the middle propellers being separated by only the intervening space and acting to draw the water and mix downward between them and then propel the mass in opposite directions towards the two end propellers, and said end propellers acting to propel the mass against the end walls of the tank, the distance between the end propellers and middle propellers being greater than the distance between the middle propellers, the end walls serving to deflect the mass outward from the axis of the shaft towards the top of the tank and the sides of the tank serving to guide the mass back to the space between the middle propellers.

4. In a feed mixer, a propeller having blades of relatively narrow outwardly tapering formation and the body of each propeller tapering from its leading edge towards its trailing edge, said blades having their maximum pitch and area adjacent the axis of rotation and their minimum pitch and area at their tips.

BOHUMIL BOUDA.